(12) United States Patent
Ding

(10) Patent No.: US 11,615,570 B2
(45) Date of Patent: Mar. 28, 2023

(54) VIRTUAL OBJECT DISPLAY METHOD AND APPARATUS, ELECTRONIC DEVICE, AND STORAGE MEDIUM

(71) Applicant: Tencent Technology (Shenzhen) Company Limited, Guangdong (CN)

(72) Inventor: Zhixuan Ding, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 105 days.

(21) Appl. No.: 17/335,879

(22) Filed: Jun. 1, 2021

(65) Prior Publication Data

US 2021/0287415 A1 Sep. 16, 2021

Related U.S. Application Data

(63) Continuation of application No. PCT/CN2020/082702, filed on Apr. 1, 2020.

(30) Foreign Application Priority Data

Apr. 30, 2019 (CN) .......................... 201910364229.6

(51) Int. Cl.
  *G06T 13/00* (2011.01)
  *G06T 11/60* (2006.01)
  (Continued)

(52) U.S. Cl.
  CPC .............. *G06T 13/00* (2013.01); *A63F 13/52* (2014.09); *A63F 13/56* (2014.09); *A63F 13/60* (2014.09);
  (Continued)

(58) Field of Classification Search
  CPC ......... G06T 13/40; G06T 13/00; G06T 13/80; G06T 13/20; A63F 13/10; A63F 2300/6607
  See application file for complete search history.

(56) References Cited

U.S. PATENT DOCUMENTS

| | | | |
|---|---|---|---|
| 2006/0062442 A1* | 3/2006 | Arnaud | A61B 6/505 382/128 |
| 2009/0179900 A1 | 7/2009 | Petrovic et al. | |

(Continued)

FOREIGN PATENT DOCUMENTS

| | | |
|---|---|---|
| CN | 102141399 A | 8/2011 |
| CN | 103077547 A | 5/2013 |

(Continued)

OTHER PUBLICATIONS

Supplementary European Search Report for EP Application No. 20798966.6 dated Jun. 10, 2022, 1p.

(Continued)

*Primary Examiner* — Todd Buttram
(74) *Attorney, Agent, or Firm* — Crowell & Moring LLP

(57) ABSTRACT

The present disclosure discloses a display method and apparatus for a virtual object, an electronic device, and a storage medium, and is related to the field of computer technologies. The method includes: obtaining a plurality of animation frames corresponding to each of a plurality of virtual objects and a weight of each animation frame; blending a plurality of animation frames corresponding to the plurality of virtual objects in parallel through an image processor according to the weight of each animation frame, to obtain target position and pose data of each bone in bone models of the plurality of virtual objects; and displaying the plurality of virtual objects in a graphical user interface according to the target position and pose data of each bone in the bone models of the plurality of virtual objects.

20 Claims, 11 Drawing Sheets

(51) Int. Cl.
*G06T 7/70* (2017.01)
*A63F 13/52* (2014.01)
*A63F 13/56* (2014.01)
*A63F 13/60* (2014.01)
*A63F 13/2145* (2014.01)
*A63F 13/822* (2014.01)

(52) U.S. Cl.
CPC ............... *G06T 7/70* (2017.01); *G06T 11/60* (2013.01); *A63F 13/2145* (2014.09); *A63F 13/822* (2014.09); *A63F 2300/1075* (2013.01); *A63F 2300/6607* (2013.01); *A63F 2300/807* (2013.01); *G06T 2200/24* (2013.01)

(56) References Cited

U.S. PATENT DOCUMENTS

| | | | |
|---|---|---|---|
| 2010/0091018 A1 | 4/2010 | Tatarchuk et al. | |
| 2010/0259538 A1 | 10/2010 | Park et al. | |
| 2011/0040168 A1* | 2/2011 | Arnaud | G06T 7/0012 600/407 |
| 2016/0093112 A1* | 3/2016 | Haw | G06T 17/005 345/419 |
| 2017/0032579 A1* | 2/2017 | Eisemann | G06T 17/205 |
| 2017/0154441 A1* | 6/2017 | Kawaguchi | G06T 7/73 |
| 2021/0279456 A1* | 9/2021 | Luo | G06V 40/10 |
| 2021/0287415 A1* | 9/2021 | Ding | A63F 13/52 |

FOREIGN PATENT DOCUMENTS

| | | | | |
|---|---|---|---|---|
| CN | 105654492 A | 6/2016 | | |
| CN | 106447748 A | 2/2017 | | |
| CN | 106856012 A | 6/2017 | | |
| CN | 107730271 A | 2/2018 | | |
| CN | 108022275 A | 5/2018 | | |
| CN | 109102521 A | 12/2018 | | |
| CN | 110102050 A | 8/2019 | | |
| WO | WO-2010002997 A1 * | 1/2010 | ........... | G06F 3/0346 |
| WO | WO 2018/050001 A1 | 3/2018 | | |
| WO | WO-2018050001 A1 * | 3/2018 | ............ | G06T 13/00 |
| WO | WO 2018/129794 A1 | 7/2018 | | |
| WO | WO 2020/220915 A1 | 11/2020 | | |

OTHER PUBLICATIONS

Extended European Search Report for application No. EP 20798966.6 dated May 23, 2022, 13p.
Thalmann, Daniel et al, "Crowd Simulation", Springer London Limited, Chapter 4 "Virtual Human Animation" pp. 81-110, Jan. 1, 2013, London, UK.
Thalmann, Daniel et al, "Crowd Simulation", Springer London, Limited, Chapter 5 "Behavioral Animation of Crowds" pp. 111-168, Jan. 1, 2013, London, UK.
Thalmann, Daniel et al, "Crowd Simulation", Springer London, Limited, Chapter 7 "Crowd Rendering", pp. 195-227, Jan. 1, 2013, London, UK.
Second Office Action for Chinese application No. 201910364229.6 dated Sep. 13, 2021, 3p, in Chinese language.
Concise Explanation of Relevance for B1, 1p.
International Search Report and Written Opinion for priority application No. PCT/CN2020/082702 dated Jun. 30, 2020, 11p, in Chinese language.
English language translation of the International Search Report for priority application No. PCT/CN2020/082702 dated Jun. 30, 2020, 2p.
Search Report for Chinese application No. CN 201910364229.6 dated Apr. 5, 2021, 2p, in Chinese language.
First Office Action for Chinese application No. CN 201910364229.6 dated Apr. 9, 2021, 3p, in Chinese language.
Concise Explanation of Relevance for A13, A15, and A16.

* cited by examiner

VIRTUAL OBJECT DISPLAY METHOD AND APPARATUS, ELECTRONIC DEVICE, AND STORAGE MEDIUM

RELATED APPLICATION

This application is a continuation of PCT Application No. PCT/CN2020/082702, entitled "VIRTUAL OBJECT DISPLAY METHOD AND APPARATUS, ELECTRONIC DEVICE, AND STORAGE MEDIUM" and filed on Apr. 1, 2020 to the National Intellectual Property Administration, PRC, which claims priority to Chinese Patent Application No. 201910364229.6, entitled "DISPLAY METHOD AND APPARATUS FOR VIRTUAL OBJECT, ELECTRONIC DEVICE, AND STORAGE MEDIUM" and filed to the National Intellectual Property Administration, PRC on Apr. 30, 2019. The above applications are incorporated herein by reference in their entireties.

TECHNICAL FIELD

The present disclosure relates to the field of computer technologies, and in particular, to a display method and apparatus for a virtual object, an electronic device, and a storage medium.

BACKGROUND

With the development of computer technologies and the diversification of terminal functions, more and more types of games can be played on terminals. In some electronic games, multiple virtual objects need to be displayed in a graphical user interface. When a virtual object is displayed, an animation-driven bone model of the virtual object can be displayed. For any frame, it is usually required to determine position and pose data of each bone in the bone model of the virtual object to determine the pose of the virtual object in the any frame.

At present, the display method for a virtual object usually relates to: for any one of a plurality of virtual objects, obtaining a plurality of animation frames corresponding to the virtual object through a central processing unit, and then blending the plurality of animation frames corresponding to the virtual object through the central processing unit to obtain position and pose data of each bone in the bone model of the virtual object in a current frame; and displaying the virtual object through an image processor. Every time the processing of one virtual object is completed, the processing of the next virtual object can be continued until the plurality of virtual objects are all processed.

SUMMARY

According to embodiments of this application, a display method and apparatus for a virtual object, an electronic device, and a storage medium are provided.

A display method for a virtual object, executed by an electronic device, including:

obtaining a plurality of animation frames corresponding to each of a plurality of virtual objects and each animation frame's weight, each animation frame including position and pose data of each bone in bone models of the virtual objects;

blending the plurality of animation frames corresponding to the plurality of virtual objects in parallel through an image processor according to each animation frame's weight, to obtain target position and pose data of each bone in the bone models of the plurality of virtual objects; and displaying the plurality of virtual objects in a graphical user interface according to the target position and pose data of each bone in the bone models of the plurality of virtual objects.

A display apparatus for a virtual object, including:

an obtaining module configured to obtain a plurality of animation frames corresponding to each of a plurality of virtual objects and each animation frame's weight, each animation frame including position and pose data of each bone in bone models of the virtual objects;

a blending module configured to blend a plurality of animation frames corresponding to the plurality of virtual objects in parallel through an image processor according to the weight of each animation frame, to obtain target position and pose data of each bone in the bone models of the plurality of virtual objects; and a display module configured to display the plurality of virtual objects in a graphical user interface according to the target position and pose data of each bone in the bone models of the plurality of virtual objects.

A display apparatus for a virtual object, including:

at least one processor configured to obtain a plurality of animation frames corresponding to each of a plurality of virtual objects and each animation frame's weight, each animation frame including position and pose data of each bone in bone models of the virtual objects; and blend a plurality of animation frames corresponding to the plurality of virtual objects in parallel through an image processor according to each animation frame, to obtain target position and pose data of each bone in the bone models of the plurality of virtual objects; and a display configured to display the plurality of virtual objects in a graphical user interface according to the target position and pose data of each bone in the bone models of the plurality of virtual objects.

An electronic device is provided, the electronic device including one or more processors and one or more memories, the one or more memories storing at least one instruction, at least one program, a code set or an instruction set, the at least one instruction, the at least one program, the code set or the instruction set being loaded and executed by the one or more processors to implement the operations performed by the display method for a virtual object.

A non-transitory computer-readable storage medium is provided, storing at least one instruction, the instruction being loaded and executed by a processor to implement the operations performed by the display method for a virtual object.

Details of one or more embodiments of this application are provided in the accompanying drawings and descriptions below. Other features and advantages of this application would become obvious with reference to the specification, the accompanying drawings, and the claims.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, implementations of the present disclosure would be further described in detail as follows with reference to the accompanying drawings. It is to be understood that the specific embodiments described herein are merely used for explaining this application but are not intended to limit this application.

Embodiments of the present disclosure mainly relate to an electronic game scene or a simulation training scene. Using the electronic game scene as an example, a user may perform an operation on a terminal in advance. After the terminal detects the operation of the user, a game configuration file of an electronic game may be downloaded, and the game configuration file may include an application program, interface display data, virtual scene data, or the like of the electronic game, so that the user may invoke the game configuration file while logging in to the electronic game on the terminal, to render and display an interface of the electronic game. The user may perform a touch operation on the terminal, and after detecting the touch operation, the terminal may determine game data corresponding to the touch operation and render and display the game data. The game data may include virtual scene data, behavioral data of a virtual object in the virtual scene, and the like.

The virtual scene involved in the present disclosure may be used for simulating a three-dimensional virtual space, or may be used for simulating a two-dimensional virtual space, and the three-dimensional virtual space or the two-dimensional virtual space may be an open space. The virtual scene can be used for simulating a real environment in reality. For example, the virtual scene may include sky, land, sea, and the like. The land may include environmental elements such as deserts and cities. A user can control a virtual object to move in the virtual scene. The virtual object may be a virtual avatar in the virtual scene used for representing the user, or may be a virtual avatar in the virtual scene used for representing a character interacting with the user. The virtual image may be in any form, such as a person or an animal. This is not limited in the present disclosure. The virtual scene may include a plurality of virtual objects, and each virtual object has a shape and a volume in the virtual scene, and occupies some space in the virtual scene.

Figure 1:
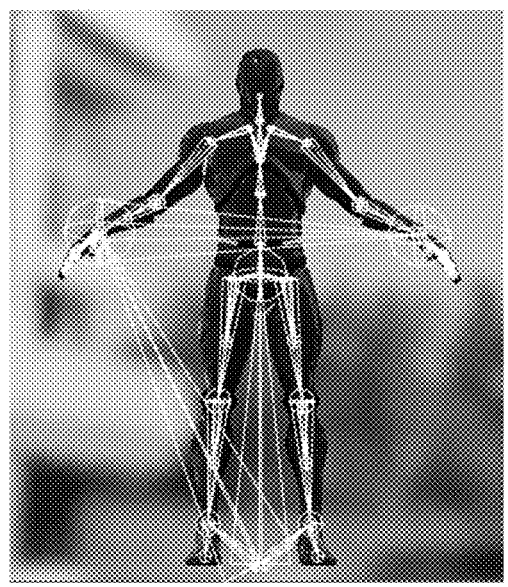
FIG. 1 is a schematic diagram of display of a virtual object according to an embodiment of the present disclosure.

Taking a shooting game as an example, in the virtual scene, the user may control the virtual object to fall freely, glide, or fall after a parachute is opened in the sky; or to run, jump, creep, bend forward in the land; or control the virtual object to swim, float, or dive in the ocean. Certainly, the user may further control the virtual object to ride in a vehicle to move in the virtual scene. The foregoing scenes are used as an example only herein, which is not specifically limited in the embodiments of the present disclosure. The user may further control the virtual object to fight with another virtual object with a weapon. The weapon may be a cold weapon, or may be a hot weapon, which is not specifically limited in the present disclosure. Certainly, scenes may also be scenes in other types of electronic games, such as role-playing games, or may be other simulated scenes. Application scenario of the method provided in the embodiments of the present disclosure are not limited. For example, as shown in FIG. 1, the terminal may display a plurality of virtual objects in a virtual scene.

Bone animation: It is a type of model animation, which refers to a series of matrix columns similar to a hierarchical relationship of biological bones. Each animation frame in the bone animation stores information such as the position and rotation of each bone, i.e., the position and pose of this bone in this animation frame. A plurality of animation frames in a continuous period of time form the motion data of each bone during this period, so that the bone model can be driven in real time by using the bone animation.

Bone model: It generally refers to a character model driven by a bone animation. Unlike general static objects, each frame of the bone model corresponds to a bone animation. The effect displayed by the bone animation may be the effect of corresponding actions made by the virtual object. In specific drawing, vertices can be skinned by sampling animation data, that is, the vertices is skinned by sampling position and pose data of each bone in the bone model.

Skinning: It refers to weighting and deforming each vertex of the character model according to the weights of all bones corresponding thereto during character rendering, so that the postures of the bones drive the finally rendered character model. In contemporary game engines, skinning may be executed every frame on a CPU or every frame on a vertex shader of a GPU, and the latter is more efficient.

For example, a skeleton of the bone model of the virtual object may be as shown in FIG. 1. When displaying the virtual object, a terminal may first determine the position and pose data of each bone in the bone model of the virtual object, and then display the virtual object based on the position and pose data.

DrawCall: In graphic display, it is sent by the CPU to the GPU. Through this draw call, the CPU can inform the GPU of which model to be drawn at which location and with what parameters. Understandably, the fewer DrawCalls are sent from the CPU to the GPU per frame, the higher the processing efficiency is.

Instancing: It refers to a way to invoke DrawCall in the graphic display. If multiple bone models with the same topology need to be displayed in one frame, DrawCall can be invoked by instancing once, to inform the GPU of how many bone models are drawn this time, and where each bone model is drawn.

Figure 2:
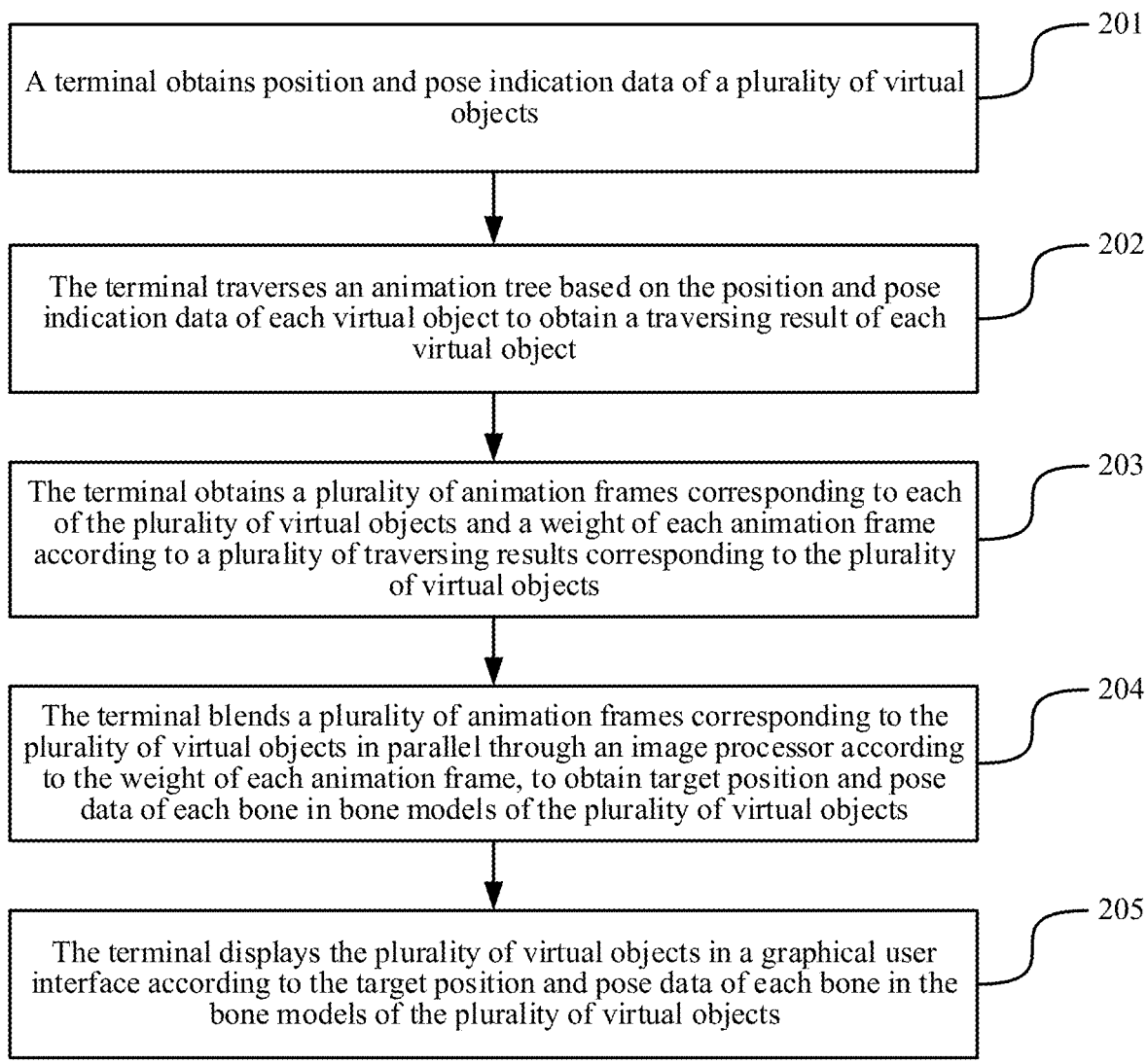
FIG. 2 is a flowchart of a display method for a virtual object according to an embodiment of the present disclosure.

FIG. 2 is a flowchart of a display method for a virtual object according to an embodiment of the present disclosure. The display method for a virtual object is applied to an electronic device. The electronic device may be provided as a terminal or as a server. This is not limited in the embodiments of the present disclosure. The following only uses the electronic device being provided as a terminal as an example for description. Referring to FIG. 2, the method may include the following steps:

201: A terminal obtains position and pose indication data of a plurality of virtual objects.

In the embodiments of the present disclosure, the terminal may display a plurality of virtual objects in a graphical user interface, and the topologies of bone models of the plurality of virtual objects may be the same or similar. When displaying each virtual object, the terminal may first determine a target pose of the virtual object, i.e., a display form. The target pose may be determined based on target position and pose data of each bone in the bone model of the virtual object, and then perform a display step. The position and pose data may include position data and pose data. That is, the terminal may first determine a target display situation of the virtual object, and then display the virtual object according to the target display situation. For example, the target position and pose data of each bone may be the position data, rotation data and the like of each bone.

Specifically, the terminal may obtain position and pose indication data of the plurality of virtual objects, and determine the target position and pose data of the plurality of virtual objects based on the position and pose indication data. The position and pose indication data is used for determining the target position and pose data of each bone in the bone models of the virtual objects. The position and pose indication data refers to data having impact on the target position and pose data of each bone in the bone models of the virtual objects.

Using an electronic game scene as an example, when the motion speed of a virtual object is different, the motion pose that the virtual object needs to display may be different, and the motion speed of the virtual object may be used as a piece of position and pose indication data. Using another electronic game scene as an example, when a user performs different control operations on the virtual object, the actions that the virtual object needs to make may be different. The detected control operations may be used as a piece of position and pose indication data. In this example, the position and pose indication data may be understood as behavior logic data of a character. The character refers to a virtual object, and the behavior logic data refers to data used for determining the behavior of the character.

The above are only two specific examples to illustrate the position and pose indication data. The specific types of data included in the position and pose indication data can be set by relevant technicians according to needs. The data types of the position and pose indication data are not limited in the embodiments of the present disclosure.

In a specific example, the terminal may obtain the position and pose indication data of the plurality of virtual objects in real time to determine the target position and pose data of the plurality of virtual objects, and then display the plurality of virtual objects. For example, the terminal may obtain the current position and pose indication data of the plurality of virtual objects, and determine the target position and pose data of each bone in the bone models of the plurality of virtual objects in the next frame, thereby displaying the next frame according to the target position and pose data of each bone in the bone models of the plurality of virtual objects. Each frame follows the above-mentioned logic of target position and pose data determination and display, so as to achieve the animation display effect of the plurality of virtual objects.

202: The terminal traverses an animation tree based on the position and pose indication data of each virtual object to obtain a traversing result of each virtual object, leaf nodes of the animation tree being associated with animation frames.

After obtaining the position and pose indication data of the plurality of virtual objects, the terminal may further determine the target position and pose data of each bone in the bone model of each virtual object according to the position and pose indication data of each virtual object. The position and pose indication data may include multiple types of data. When the types of the data are different, the virtual object may make different actions, that is, according to the position and pose indication data, a plurality of animation frames of the virtual object may be determined.

For example, for a virtual object, in the position and pose indication data, a certain piece of position and pose indication data of the virtual object may indicates that the virtual object makes a running pose, another piece of position and pose indication data may indicates that the virtual object turns around, and there may also be another piece of position and pose indication data to indicate that the virtual object lifts a virtual prop. Furthermore, in the position and pose indication data of the virtual object, multiple pieces of position and pose indication data may also respectively indicate that the wrist and elbow of the virtual object appear to be 30 degrees and 60 degrees. These all need to be taken into consideration when determining the target position and pose data of the virtual object.

The terminal may obtain, according to the position and pose indication data of each virtual object, a plurality of animation frames corresponding to the virtual object. This obtaining process may be implemented based on an animation tree. The leaf nodes of the animation tree are associated with animation frames. The terminal may traverse the animation tree based on the position and pose indication data of each virtual object, so as to obtain the traversing result of each virtual object based on decision logic of the animation tree. The traversing result indicates which leaf nodes of the animation tree the position and pose indication data of each virtual object conforms to, so as to determine which animation frames the position and pose indication data corresponds to.

Figure 3:
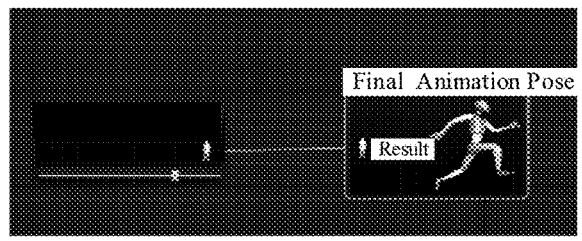
FIG. 3 is a schematic diagram of an animation tree according to an embodiment of the present disclosure.
Figure 3:

All the leaf nodes of the animation tree may be associated with all the animation frames corresponding to the virtual object. Every time the target position and pose data of each bone in the bone model of the virtual object is determined, which leaf nodes the position and pose indication data of the virtual object falls on can be determined. In a possible implementation, the animation tree may include a Root node and an AssetPlayer node, or include a Root node, a Blend node, and an AssetPlayer node. The Root node is a starting node of an animation tree, and may also be called Anim-Node_Root herein. Anim means animated. The Blend node is generally a blend node in the middle of the animation tree, and specific blending may be determined based on the configuration according to the position and pose indication data when updating the node. The AssetPlayer node is an asset player node, which refers to the leaf node of the animation tree and is associated with the animation frame. The animation frame refers to an animation resource. In a specific possible implementation, the animation tree may be a blueprint editor in an Unreal Engine (UE) 4, and the UE 4 is a game engine. In FIG. 3, Anim refers to animated, Root refers to a root or an origin, Asset refers to an asset, Player refers to a player, Blend refers to blend, Sequence refers to a sequence, Final Animation Pose refers to a final animation pose, and Result refers to a result.

Figure 4:
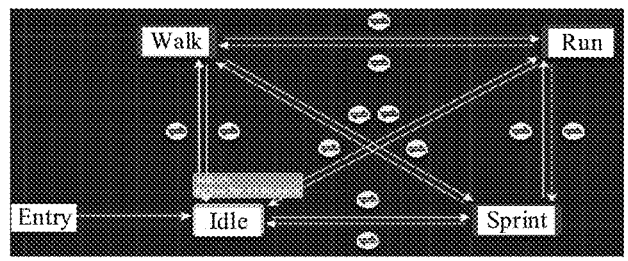
FIG. 4 is a schematic diagram of an animation tree according to an embodiment of the present disclosure.
Figure 4:
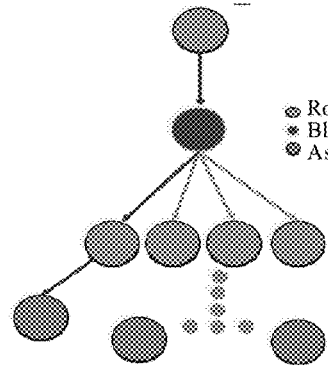

When the virtual object is displayed, the position and pose indication data can be inputted in each frame, and the animation frame is traversed to select an animation frame that needs to be blended in this frame. For example, as shown in FIG. 3, the animation tree includes a Root node and an AssetPlayer node. One AssetPlayer node is directly hung under the Root node of the animation tree, that is, the virtual object only corresponds to one animation frame. The display of the virtual object in each frame is animated according to the animation frame to show the phenomenon that the virtual object makes a fixed action. For another example, as shown in FIG. 4, the animation tree includes a Root node, a Blend node, and an AssetPlayer node. The terminal may make a selection from a plurality of leaf nodes according to the position and pose indication data, for example, may make a selection among idle, walk, run and sprint animation frames according to speed data of the virtual object. With a few more layers, a plurality of animation frames and the weight of each animation frame can be determined from the plurality of leaf nodes, that is, the content shown in step 203 below.

203: The terminal obtains the plurality of animation frames corresponding to each of the plurality of virtual objects and the weight of each animation frame according to a plurality of traversing results corresponding to the plurality of virtual objects.

Each animation frame includes the position and pose data of each bone in the bone model of the virtual object.

Through step 202 above, the terminal can obtain the traversing result of each virtual object. The traversing result indicates which leaf nodes of the animation tree the position and pose indication data of each virtual object conforms to, i.e., indicating a plurality of leaf nodes the virtual object corresponds to, so that the terminal can obtain the plurality of animation frames corresponding to each virtual object and the weight of each animation frame according to the traversing result of each virtual object.

In this way, through step 203, for each virtual object, the terminal determines a plurality of animation frames corresponding to each virtual object that need to be blended and the weights thereof, so as to facilitate subsequent blend of the plurality of animation frames corresponding to each virtual object, to determine the target position and pose data of each bone in the bone model of each virtual object. In this way, the pose or display form of each virtual object in the final display also meets the target position and pose data.

In a possible implementation, when starting a virtual object display function, initialization may be performed first, and then the steps of the display method for a virtual object provided in the embodiments of the present disclosure are performed. For example, in an electronic game scene, when the electronic game is running, the terminal can perform initialization and write data to be acquired, so that based on the determining step, some data can be subsequently selected from the data to be acquired for acquisition. In the embodiments of the present disclosure, the data to be acquired may be in the form of a map. Subsequently, the terminal can also obtain the target position and pose data of each bone in the bone models of the plurality of virtual objects based on the blending of the plurality of animation frames, and then store the data in a map. Hereinafter, the map that stores the target position and pose data of each bone in the bone models of the plurality of virtual objects is a first map, and the map that stores all the animation frames to be acquired is a second map.

Figure 5:
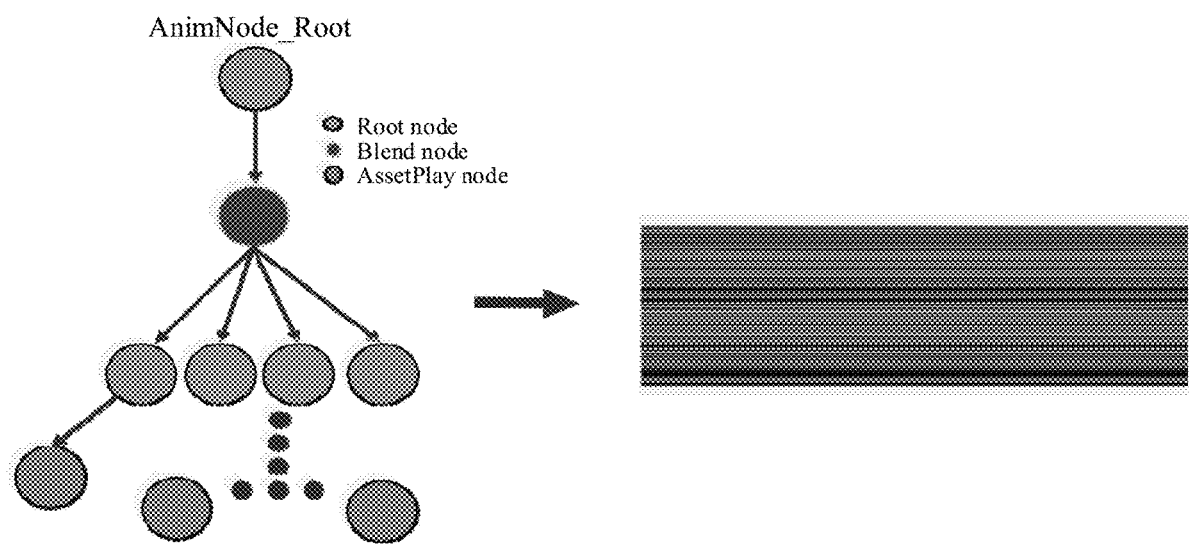
FIG. 5 is a schematic diagram of an obtaining process of a second map according to an embodiment of the present disclosure.

Specifically, the terminal can traverse the animation tree to obtain animation frames associated with all the leaf nodes of the animation tree. The animation frames associated with all the leaf nodes are stored in the second map. The terminal may store the animation tree, for example, the animation tree may be the blueprint editor of the UE 4. The terminal may first start the blueprint engine, obtains the animation frames associated with all the leaf nodes and stores same in the second map, so as to use the second map as a data basis. After each traversal of the animation tree to obtain the traversing result of each virtual object, the plurality of animation frames that need to be blended can be obtained from the second map. For example, as shown in FIG. 5, the terminal may traverse the animation tree as shown in the left diagram, and can obtain the second map as shown in the right diagram. The animation tree is only an example, and the actual structure thereof is not limited.

Accordingly, in step 203, the terminal may obtain the plurality of animation frames corresponding to the plurality of virtual objects and the weight of each animation frame from the second map according to the plurality of traversing results corresponding to the plurality of virtual objects. Specifically, for the traversing result of each virtual object, the terminal may obtain, according to identification information of the plurality of leaf nodes in the traversing result, identification information of the plurality of animation frames associated with the identification information of the plurality of leaf nodes, thereby obtaining the plurality of animation frames from the second map according to the identification information of the plurality of animation frames, and then obtain the weight of each of the plurality of animation frames based on the traversing result.

Figure 6:
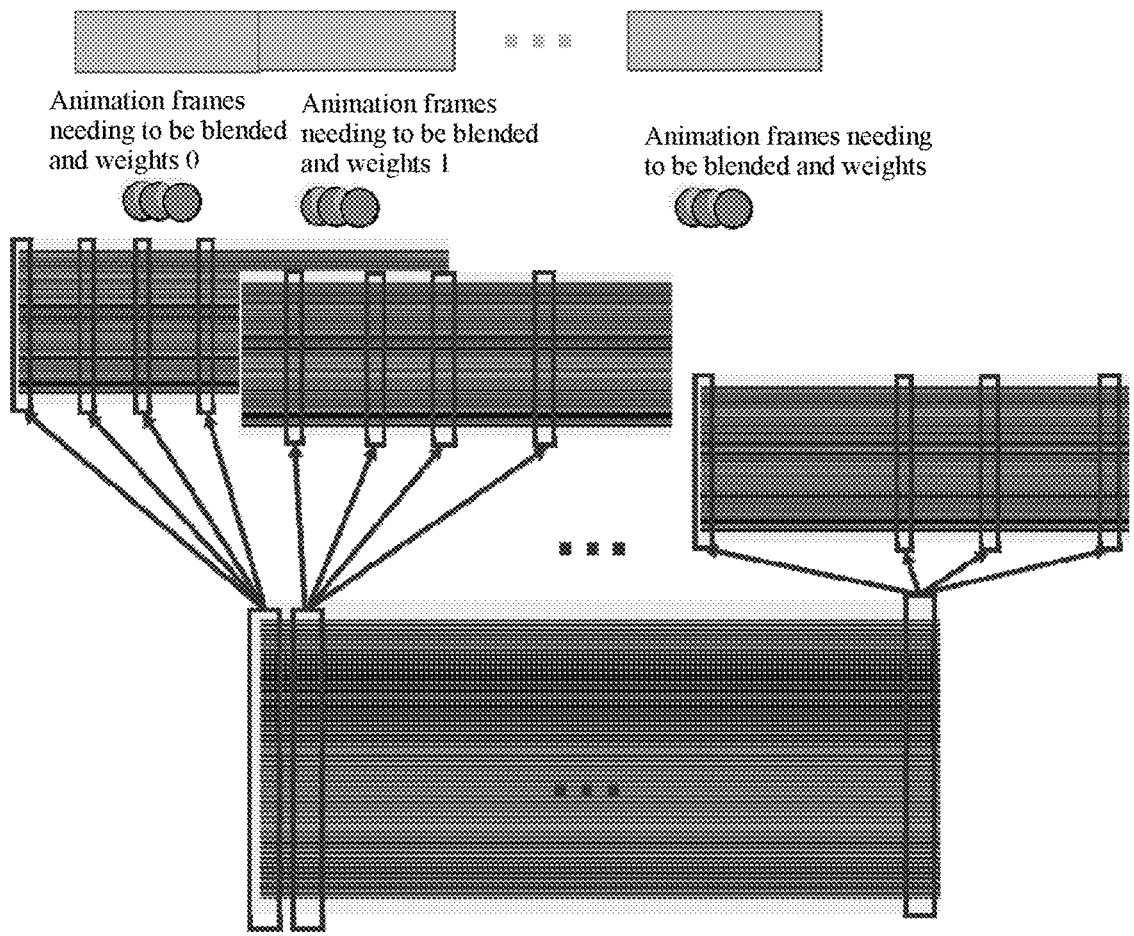
FIG. 6 is a schematic diagram of a process of obtaining a plurality of animation frames from a second map according to an embodiment of the present disclosure.

In a possible implementation, each animation frame may exist in the form of a matrix, that is, each animation frame may be a first bone animation matrix, and the second map is the same. The second map may be a second bone animation matrix including all the animation frames. The second bone animation matrix may be obtained based on the first bone animation matrix, for example, each column of the second bone animation matrix may be the data of an animation frame. Each column may correspond to the identification information of an animation frame. The terminal may extract, according to the identification information of the plurality of animation frames, the plurality of animation frames from a plurality of columns corresponding to the identification information from the second map. For example, as shown in FIG. 6, the terminal may extract the animation frames in the plurality of columns from the bone animation matrix of the second map to perform the subsequent animation frame blending step.

Steps 201 to 203 are a process of obtaining the plurality animation frames corresponding to each of the plurality of virtual objects and the weight of each animation frame. In this process, for each virtual object, every time the target position and pose data of each bone in the bone model of the virtual object is determined, which leaf nodes the position and pose indication data of the virtual object falls on can be determined, and then the plurality of animation frames associated with these leaf nodes are determined as the plurality of animation frames the position and pose indication data conforms to, so that these animation frames can be blended subsequently to obtain the target position and pose data of each bone in the bone model of the virtual object.

In a possible implementation, the terminal may perform, through a plurality of task threads in a central processing unit (CPU), the step of obtaining the plurality of animation frames corresponding to each of the plurality of virtual objects and the weight of each animation frame. In this way, the multi-threaded method can reduce the time and overhead required for the CPU to obtain the plurality of animation frames corresponding to the plurality of virtual objects and the weight, improve the efficiency of obtaining the plurality of animation frames corresponding to the plurality of virtual objects and the weight, and may not occupy the main thread, so that the overhead of the main thread is zero, thereby effectively improving the efficiency of the obtaining process.

204: The terminal blends the plurality of animation frames corresponding to the plurality of virtual objects in parallel through an image processor according to the weight of each animation frame, to obtain target position and pose data of each bone in the bone models of the plurality of virtual objects.

After determining the plurality of animation frames corresponding to each of the plurality of virtual objects and the weight, the terminal may blend the plurality of animation frames corresponding to each virtual object to determine the target position and pose data of each bone in the bone model of each virtual object.

In the related art, the process is generally to obtain a plurality of animation frames corresponding to a virtual object through a thread of the CPU, and continue to blend the plurality of animation frames based on the thread. Only after the processing of the virtual object is finished, the next virtual object is then processed in the same way. Moreover, in the embodiments of the present disclosure, the step of animation frame blending can be completed through the image processor, such as a GPU, and since the image processor has a large number of cores and can support high-concurrency processing tasks, the plurality of animation frames corresponding to the plurality of virtual objects can be blended in parallel. In this way, there is no need to determine the target position and pose data of each bone in the bone models of the plurality of virtual objects in series, which can greatly improve the processing efficiency of the plurality of virtual objects, thereby improving the display efficiency of the virtual object display process.

Specifically, the process of performing animation frame blending by the terminal may be as follows: for each of the plurality of virtual objects, the terminal weights the position and pose data of each bone in the bone models in the plurality of animation frames corresponding to each virtual object according to weights of the plurality of animation frames corresponding to each virtual object, to obtain the target position and pose data of each bone in the bone model of each virtual object.

For example, the position and pose data of each bone may include the position data and the rotation data of each bone. For each bone in the bone model of each virtual object, the terminal may weight the position data and the rotation data of the bone in the plurality of animation frames corresponding to each virtual object, to obtain the position data and the rotation data of the bone in the bone model of each virtual object.

In a specific example, for each bone in the bone model of each virtual object, the terminal may weight the coordinates of the bone in a bone coordinate system in the plurality of animation frames corresponding to each virtual object according to the weights of the plurality of animation frames corresponding to each virtual object, to obtain the coordinates of the bone in the bone model of each virtual object in the bone coordinate system. The terminal may transform the coordinates of the bone in the bone model of each virtual object in the bone coordinate system to coordinates in a bone model coordinate system to facilitate subsequent skinning and display. The terminal may also transform the coordinates in the bone model coordinate system to coordinates in a global coordinate system based on the position information of the virtual object in a virtual scene, so as to use the coordinates in the global coordinate system as the target position and pose data of the bone, so that the position and pose of each virtual object in the virtual scene can be reflected when displaying each virtual object. In a possible implementation, the terminal may perform animation frame blending through one computer shader, and perform coordinate transformation through another computer shader.

Figure 7:
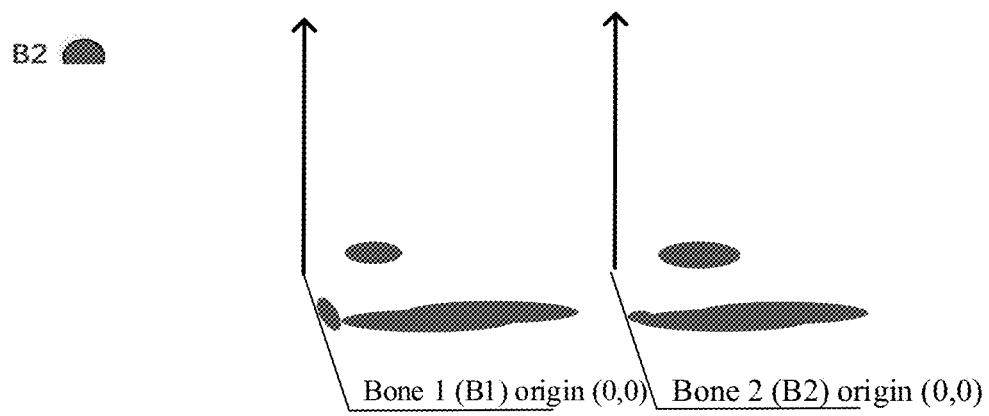
FIG. 7 is a schematic diagram of a plurality of bones according to an embodiment of the present disclosure.
Figure 8:
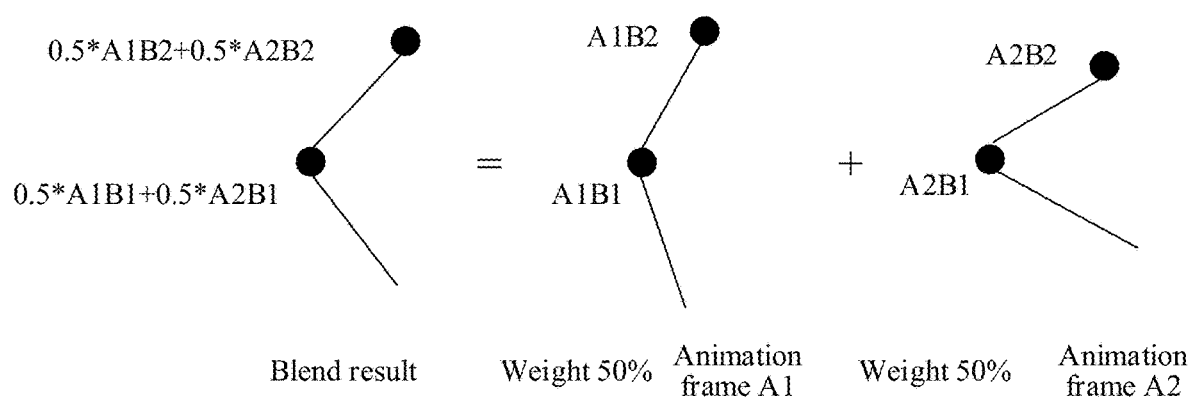
FIG. 8 is a schematic diagram of an animation frame blending process according to an embodiment of the present disclosure.

As shown in FIG. 7, using a first bone (B1) and a second bone (B2), and the number of the plurality of animation frames corresponding to the virtual object being two (a first animation frame A1 and a second animation frame A2) as an example for description, the position and pose data of the first bone in the first animation frame may be A1B1, the position and pose data of the first bone in the second animation frame may be A2B1, the position and pose data of the second bone in the first animation frame may be A1B2, and the position and pose data of the second bone in the second animation frame may be A2B2. Assuming that the weights of the two animation frames are both 0.5, as shown in FIG. 8, the result of blending the two animation frames, i.e., the target position and pose data (RB1 and RB2) of the first bone and the second bone may be RB1=0.5*A1B1+0.5*A2B1 and RB2=0.5*A1B2+0.5*A2B2, respectively. RB1 and RB2 are coordinates in the bone coordinate system. the terminal may also perform coordinate transformation to convert the two as coordinates (SB1 and SB2) in the bone model coordinate system, SB1=RB1=0.5*A1B1+0.5*A2B1, and SB2=RB1*RBn=(0.5*A1B2+0.5*A2B2)*(0.5*A1B1+0.5*A2B1). The above only uses two bones as an example, when it is extended to n bones, $$SBn=(W1*A1Bn+W2*A2Bn+Wm*AmBn)**$$
$$(W1*A1B2+W2*A2B2+\ldots Wm*AmB2)*$$
$$(W1*A1B1+W2*A2B1+Wm*AmB1);B1-B2-\ldots$$
$$Bn$$

are n bones; A1, A2, . . . , Am are m animation frames; W1, W2, . . . , Wm are the respective weights of the m animation frames; and both n and m are positive integers. * is used for representing performing quaternion multiplication on rotation data and performing matrix multiplication on position data.

When transforming the coordinates in the bone model coordinate system to the coordinates in the global coordinate system, the coordinates of the bone model in the global coordinate system need to be taken into account, and the details are not described herein again.

In a possible implementation, the terminal can perform animation frame blending on the plurality of virtual objects through a plurality of parallel channels. Specifically, the terminal can blend the plurality of animation frames corresponding to the plurality of virtual objects in parallel through the plurality of parallel channels of the image processor based on the number of the plurality of virtual objects and according to the weight of each animation frame, to obtain the target position and pose data of each bone in the bone models of the plurality of virtual objects. Each parallel channel is configured to blend a plurality of animation frames corresponding to one virtual object. Because the GPU has a large number of cores and supports high-concurrency processing tasks, the processing efficiency can be effectively improved.

In this implementation, before step 204, the terminal may obtain the number of the plurality of virtual objects, and obtain a target number of parallel channels of the image processor according to the number of the plurality of virtual objects. The number of the parallel channels of the image processor may be determined according to the number of the plurality of virtual objects, and the number of the parallel channels is named the target number herein. Understandably, if the number of the virtual objects needing to be determined is large, the number of the parallel channels required is relatively large. Specifically, the process of obtaining the target number of parallel channels of the image processor by the terminal may be implemented in either of the following two ways:

The first way: the terminal uses the number of the plurality of virtual objects as a target number to obtain the target number of parallel channels of the image processor.

In the first way, because the image processor has a large number of cores and can support high-concurrency processing tasks, the terminal can obtain the same number of parallel channels according to the number of the plurality of virtual objects, and determine one of the plurality of virtual objects through each parallel channel. For example, if the number of the plurality of virtual objects is 1000, the terminal can obtain 1000 parallel channels of the image processor. One parallel channel corresponds to one virtual object.

The second way: when the number of the plurality of virtual objects is greater than a number threshold, the terminal uses the number threshold as a target number, and obtain the target number of parallel channels of the image processor; when the number of the plurality of virtual objects is less than or equal to the number threshold and the processing capability of the image processor of the terminal is different, the target number may also be different. The number of the plurality of virtual objects is used as the target number, and the target number of parallel channels of the image processor are obtained.

In the second way, the device considers the parallel processing capability of the image processor, and the number threshold may be set in the terminal, that is, the terminal can process the number threshold of virtual objects in parallel through the image processor. If the number of the virtual objects is greater than the number threshold, the virtual objects can be processed in batches. The number threshold may be the maximum number of the plurality of virtual objects that the image processor determines in parallel. The number threshold may be set by the relevant technicians according to the processing capability and requirements of the image processor, and this is not limited in the embodiments of the present disclosure. For example, the number threshold may be 100. If the number of the virtual objects is 1000, the terminal can obtain 100 parallel channels to determine the virtual objects in ten batches. Moreover, if the number of the virtual objects is 50, the terminal can obtain 50 parallel channels.

The terminal may use either of the above-mentioned two ways to obtain a plurality of parallel channels. The specific implementation can be set by the relevant technicians according to the processing capability of the image processor of the terminal, and this is not limited in the embodiments of the present disclosure.

In a possible implementation, a selection may be made among the plurality of animation frames corresponding to each virtual object obtained in step 203, and a plurality of selected animation frames are blended. Specifically, the terminal may use the target number of animation frames having maximum weights as target animation frames corresponding to each virtual object according to the weight of each animation frame. The terminal blends the target animation frames corresponding to each virtual object according to the weights of the target animation frames, to obtain the target position and pose data of each bone in the bone model of each virtual object.

The target number may be set by the relevant technicians according to needs. For example, the target number may be eight, and the target number is not limited in the embodiments of the present disclosure. In this way, the animation frames having a greater impact on the blending result are blended, and the animation frames having a small impact on the blending result can be ignored, so that the amount of calculation can be effectively reduced and the time required for the animation frame blending process is reduced, to improve the efficiency of animation frame blending, thereby improving the display efficiency of the virtual objects.

Certainly, in this implementation, when the number of the plurality of animation frames corresponding to each virtual object is less than or equal to the target number, the terminal uses the plurality of animation frames corresponding to each virtual object as the target animation frames corresponding to each virtual object. For example, if the number of the animation frames corresponding to a certain virtual object is five, the terminal can blend the five animation frames.

In a possible implementation, after step 203 above, the terminal may write the plurality of animation frames corresponding to each of the plurality of virtual objects and the weight of each animation frame into a cache. Therefore, step 204 may be extracting the plurality of animation frames corresponding to each of the plurality of virtual objects and the weight of each animation frame from the cache through the image processor and performing the step of blending the plurality of animation frames corresponding to the plurality of virtual objects in parallel according to the weight of each animation frame, to obtain the target position and pose data of each bone in the bone models of the plurality of virtual objects.

In a specific possible implementation, the terminal may write the plurality of animation frames and the weight of each animation frame into a buffer. The terminal may allocate a larger buffer in the image processor during initialization, and subsequently obtain the animation frames that need to be blended for each frame and then them into the buffer. Therefore, corresponding data can be read from the buffer through the image processor to continue processing.

Specifically, the terminal may write the plurality of animation frames corresponding to each of the plurality of virtual objects and the weight of each animation frame into the buffer. In step 204, the terminal may read the plurality of animation frames corresponding to each of the plurality of virtual objects and the weight of each animation frame from the buffer through the image processor, and perform the step of blending the plurality of animation frames corresponding to the plurality of virtual objects in parallel according to the weight of each animation frame, to obtain the target position and pose data of each bone in the bone models of the plurality of virtual objects.

In the above-mentioned process of writing into the cache or writing into the buffer, the terminal may also correspondingly store the identification information of each virtual object, the plurality of animation frames corresponding to each virtual object, and positions of the weights in the cache or the buffer. Furthermore, the terminal can learn the plurality of animation frames corresponding to each virtual object and the positions of the weights in the cache or the buffer according to the identification information of each virtual object, and read corresponding data from the positions through the image processor.

Figure 9:
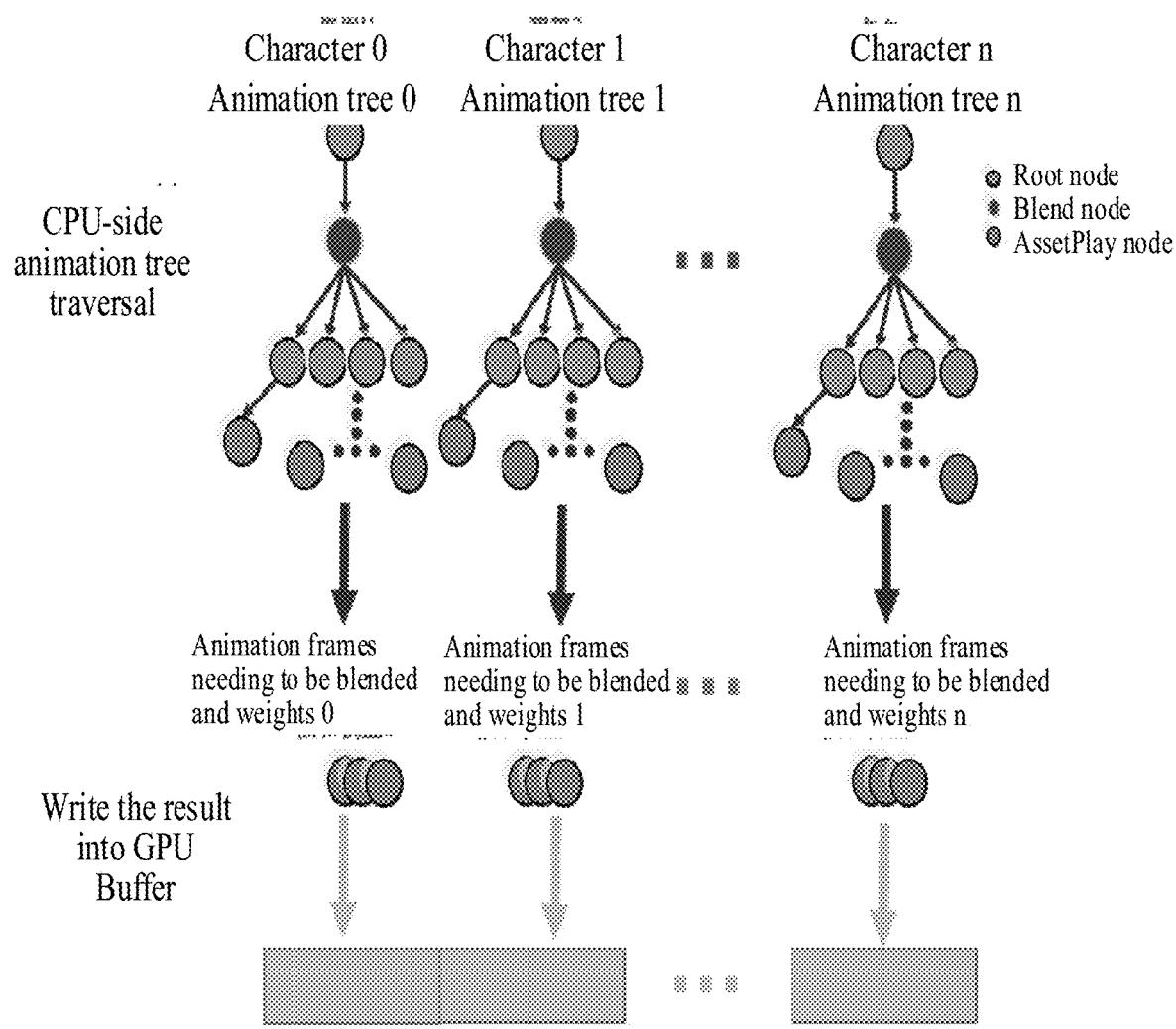
FIG. 9 is a schematic diagram of a process of writing animation frames and weights into a buffer according to an embodiment of the present disclosure.

For example, as shown in FIG. 9, n virtual objects are referred to as n characters herein. The terminal can traverse an animation tree 0 to an animation tree n through a central processing unit (CPU) to obtain animation frames needing to be blended and weights 0 to n, and both n and m are positive integers. That is, each virtual object correspond to a plurality of animation frames and weights, and a result is written into a buffer of an image processor (GPU). As shown in FIG. 6, the terminal may read the animation frames needing to be blended of each virtual object and weights from the buffer through the image processor, and then extract a plurality of animation frames from a second map for blending, to obtain target position and pose data of each bone in a bone model of each virtual object.

In a possible implementation, the terminal may store the target position and pose data of each bone in bone models of the plurality of virtual objects in a first map. For example, as shown in FIG. 6, the terminal store all blending results in the first map. Understandably, the first map may also be in the form of a bone animation matrix. For example, the width of the first map is the sum of all animation frames, and the height is the number of bones. Each column is the target position and pose data of each bone in the bone model of each virtual object.

205: The terminal displays the plurality of virtual objects in a graphical user interface according to the target position and pose data of each bone in the bone models of the plurality of virtual objects.

After obtaining the target position and pose data of each bone in the bone models of the plurality of virtual objects, the terminal may determine a display form of each virtual object, and then display a corresponding display form in the graphical user interface. The pose of each virtual object displayed conforms to the target position and pose data of each bone in the bone model of each virtual object.

Specifically, the terminal may skin each virtual object according to the target position and pose data of each bone in the bone model of each virtual object to obtain the display form of each virtual object, and display the display form of each virtual object in the graphical user interface.

In the skinning process, the terminal may obtain the position of each vertex according to the target position and pose data of at least one bone corresponding to each vertex. After the positions of all vertices are determined, the display form of the virtual object is also determined, so that the terminal can display same in the graphical user interface according to the positions of the vertices.

In the above-mentioned implementation method in which the target position and pose data of each bone in the bone models of the plurality of virtual objects is stored in the first map, in step 205, the terminal may sample the first map and display the plurality of virtual objects in the graphical user interface according to the target position and pose data obtained by sampling.

In a possible implementation, the terminal may correspondingly store the target position and pose data of each bone in the bone models of the plurality of virtual objects and the identification information of the plurality of virtual objects in the first map. Accordingly, the sampling process may be as follows: the terminal samples the first map according to the identification information of the plurality of virtual objects, and displays the plurality of virtual objects in the graphical user interface according to the target position and pose data obtained by sampling.

In a specific possible implementation, the target position and pose data of each bone in the bone model may also be stored corresponding to the identification information of each bone. For example, the identification information of the virtual object may be represented by a character ID, and the identification information of each bone may be represented by a bone ID. The terminal may sample the first map according to the character ID and the bone ID, to display the character.

In a possible implementation, the terminal may display the plurality of virtual objects in batches, thereby reducing the number of initiations of draw calls, and improving the processing efficiency. Specifically, the terminal may instance a draw call to obtain an object. The draw call includes the identification information of the plurality of virtual objects. The terminal may sample the first map according to the identification information of the plurality of virtual objects through the object (i.e., using the object), and performs the step of displaying the plurality of virtual objects in the graphical user interface according to the target position and pose data obtained by sampling.

The process of batch display refers to invoking a draw call (DrawCall) through an instancing approach, and then rendering and displaying the plurality of virtual objects in batches. In this way, the plurality of virtual objects can may be displayed by invoking and initiating a DrawCall once, which can greatly reduce the number of initiations of the DrawCall and improve the processing efficiency.

In a possible implementation, the draw call may include the plurality of animation frames corresponding to the plurality of virtual objects and the position of the weight of each animation frame in the cache. Specifically, the draw call may include the plurality of animation frames corresponding to the plurality of virtual objects and the position of the weight of each animation frame in the buffer. Furthermore, the terminal may read data from the cache or the buffer through the image processor according to the position for animation frame blending, and display the virtual objects according to the blended data.

Figure 10:
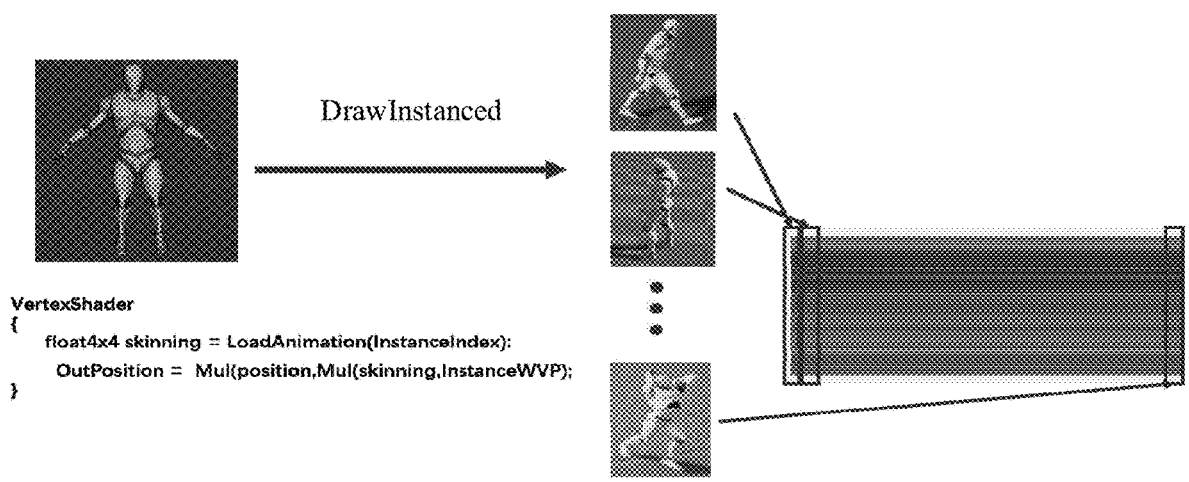
FIG. 10 is a schematic diagram of a display process of a plurality of virtual objects according to an embodiment of the present disclosure.

For example, as shown in FIG. 10, when the terminal displays the plurality of virtual objects (the virtual objects are referred to as instances herein), the plurality of instances may be draw instanced in batches through the above-mentioned instancing approach. The target position and pose data of each bone in the bone model of each instance may be obtained by sampling from the first map. As an example, during the display process, skinning may be performed on the vertices of the bone model of the virtual object through a vertex shader. Skinning data may be a float, and the size is 4*4. The skinning process is a process of loading an animation according to an index (identification information) of the instance. The index of the instance may be represented by InstanceIndex, a loaded animation may be represented by LoadAnimation, an output pose (OutPosition) is a combination result of the position of the instance and the skinning according to a bone animation matrix (InstanceWVP) of the instance, and mul is quaternion multiplication for rotation data and matrix multiplication for position data. Only one example is used for illustration there, and the specific drawing process is not limited.

In this process, the plurality of virtual objects are regarded as a group, and the group is directly displayed in batches, which can greatly reduce the number of DrawCalls initiated and the load of the CPU, and can effectively improve the display efficiency. In this way, the number of virtual objects supported to display by the method provided in the embodiments of the present disclosure is significantly increased, which can break through the bottleneck of the number of virtual objects in related art.

Figure 11:
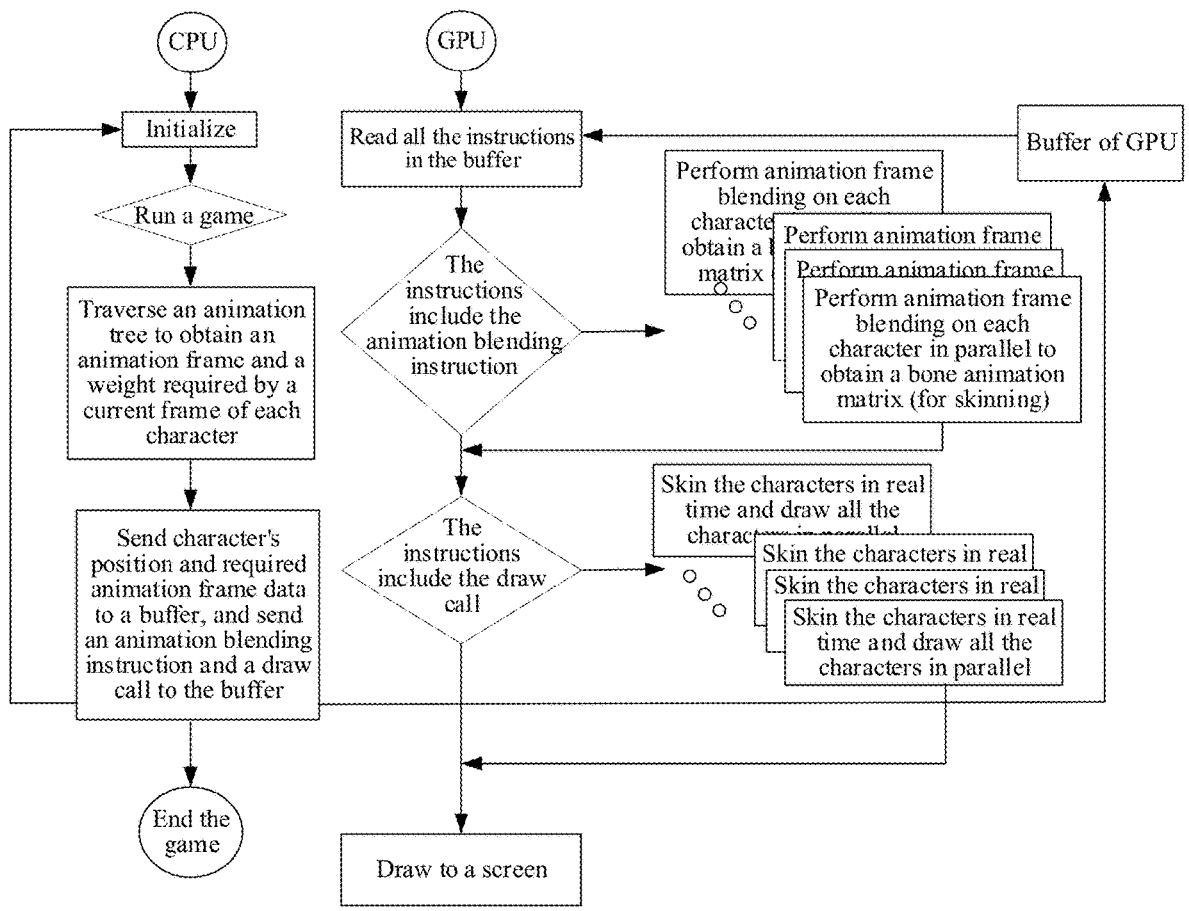
FIG. 11 is a flowchart of a display method for a virtual object according to an embodiment of the present disclosure.

For example, as shown in FIG. 11, in a specific example, using an electronic game scene as an example, when a game starts to run, the terminal can perform initialization and write data to be acquired, so that based on the determining step, some data can be subsequently selected from the data to be acquired for acquisition. In the embodiments of the present disclosure, the data to be acquired may be in the form of a map. Subsequently, the terminal can also obtain the target position and pose data of each bone in the bone models of the plurality of virtual objects based on the blending of the plurality of animation frames, and then store the data in a map. After that, the map that stores the target position and pose data of each bone in the bone models of the plurality of virtual objects is a first map, and the map that stores all the animation frames to be acquired is a second map.

Figure 12:
FIG. 12 is a schematic diagram of display of a plurality of virtual objects according to an embodiment of the present disclosure.

In the embodiments of the present disclosure, using a virtual object as an example, when a game is running after initialization, the terminal may traverse an animation tree through the CPU according to game data, to obtain animation frames required by a current frame of each character and the weights (animation frame data), and send character position and the required animation frame data to the buffer. The terminal may also send an animation frame blending instruction and a draw call to the buffer through a CPU. The terminal may read all instructions in the buffer through a GPU, and perform animation frame blending on each character in parallel through the GPU when the instructions includes the animation frame blending instruction, to obtain a bone animation matrix, for use in skinning. When the instructions include the draw call, the characters may be skinned in real time, and all the characters may be drawn in parallel once for all, thereby drawing a plurality of characters onto a screen (a graphical user interface). As shown in FIG. 12, a large number of characters are drawn simultaneously on the screen. The above-mentioned process can be performed when each frame is displayed on the screen until the end of the game.

Through a test, the virtual object display efficiency provided in the embodiments of the present disclosure is extremely high. For the same 1000 character models in a game engine of a UE 4, if an approach of serial processing by a CPU in the related art is used, the overhead is 30 milliseconds, while the method provided in the embodiments of the present disclosure only needs 2 milliseconds. Moreover, an animation frame obtaining step is implemented through a plurality of task threads of the CPU, which can make the main thread overhead be zero, thereby significantly improving the processing efficiency. Performing animation frame blending on the plurality of virtual objects in parallel through the GPU takes only 0.75 milliseconds. Moreover, the target position and pose data of each bone of each virtual object can be obtained at any stage of GPU display. Therefore, the plurality of virtual objects may be directly regarded as a group, and a DrawCall is initiated through instancing, which greatly reduces the display burden and time. The display time is reduced from 25 milliseconds to 2 milliseconds, and the efficiency is increased tenfold.

According to the embodiments of the present disclosure, the plurality of animation frames and weights corresponding to the plurality of virtual objects are obtained, animation frame blending is performed on the plurality of virtual objects in parallel through the image processor to obtain the target position and pose data of each bone in the bone model of each virtual object, and the target position and pose data is used as a basis for displaying the plurality of virtual objects, so as to display the plurality of virtual objects. In this process, by performing animation frame blending on the plurality of virtual objects in parallel through the image processor, there is no need to obtain the animation frames and the weights one by one by the central processing unit and to blend and display the animation frames, thus the processing burden of the central processing unit can be effectively reduced to avoid the problem of overload of the central processing unit. Therefore, the processing efficiency can be greatly improved, thereby improving the display efficiency of the virtual object display process, and the display effect of the virtual object is also improved.

An embodiment of the present disclosure may be formed by using any combination of all the foregoing technical solutions, and details are no longer described herein one by one.

It is to be understood that, although each step of the flowcharts in FIG. 2 is displayed sequentially according to arrows, the steps are not necessarily performed according to an order indicated by arrows. Unless otherwise explicitly specified in this application, execution of the steps is not strictly limited, and the steps may be performed in other sequences. Moreover, at least a part of the steps in FIG. 2 may include a plurality of sub-steps or a plurality of stages. These sub-steps or stages are not necessarily executed and completed at the same time, but can be executed at different times. The order of execution of these sub-steps or stages is likewise not necessarily performed sequentially, but may be performed in turn or alternately with other steps or at least a part of sub-steps or stages of other steps.

Figure 13:
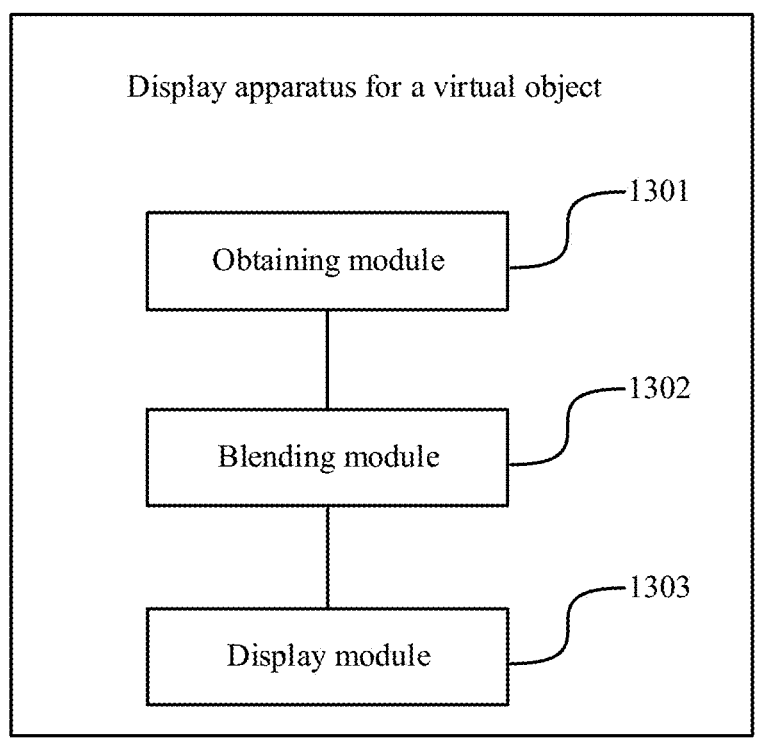
FIG. 13 is a schematic structural diagram of a display apparatus for a virtual object according to an embodiment of the present disclosure.

FIG. 13 is a schematic structural diagram of a display apparatus for a virtual object according to an embodiment of the present disclosure. Referring to FIG. 13, the apparatus includes:

an obtaining module 1301 configured to obtain a plurality of animation frames corresponding to each of a plurality of virtual objects and a weight of each animation frame, each animation frame including position and pose data of each bone in bone models of the virtual objects;

a blending module 1302 configured to blend a plurality of animation frames corresponding to the plurality of virtual objects in parallel through an image processor according to the weight of each animation frame, to obtain target position and pose data of each bone in the bone models of the plurality of virtual objects; and a display module 1303 configured to display the plurality of virtual objects in a graphical user interface according to the target position and pose data of each bone in the bone models of the plurality of virtual objects.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In a possible implementation, the blending module 1302 is configured to blend the plurality of animation frames corresponding to the plurality of virtual objects in parallel through the plurality of parallel channels of the image processor based on the number of the plurality of virtual objects and according to the weight of each animation frame, to obtain the target position and pose data of each bone in the bone models of the plurality of virtual objects. Each parallel channel is configured to blend a plurality of animation frames corresponding to one virtual object.

In a possible implementation, the blending module 1302 is configured to: for each of the plurality of virtual objects, weight the position and pose data of each bone in the bone models in the plurality of animation frames corresponding to each virtual object according to weights of the plurality of animation frames corresponding to each virtual object, to obtain the target position and pose data of each bone in the bone model of each virtual object.

In a possible implementation, the blending module 1302 is configured to:

use a target number of animation frames having maximum weights as target animation frames corresponding to each virtual object according to the weight of each animation frame; and blend the target animation frames corresponding to each virtual object according to the weights of the target animation frames, to obtain the target position and pose data of each bone in the bone model of each virtual object.

In a possible implementation, the apparatus further includes:

a first storage module configured to store the target position and pose data of each bone in the bone models of the plurality of virtual objects in a first map.

The display module 1303 is configured to sample the first map to display the plurality of virtual objects in the graphical user interface.

In a possible implementation, the first storage module is configured to correspondingly store the target position and pose data of each bone in the bone models of the plurality of virtual objects and identification information of the plurality of virtual objects in the first map.

The display module 1303 is configured to sample the first map according to the identification information of the plurality of virtual objects, to display the plurality of virtual objects in the graphical user interface.

In a possible implementation, the display module 1303 is configured to:

instance a draw call to obtain an object, the draw call including the identification information of the plurality of virtual objects; and perform the step of sampling the first map according to the identification information of the plurality of virtual objects, to display the plurality of virtual objects in the graphical user interface.

In a possible implementation, the obtaining module 1301 is configured to:

obtain position and pose indication data of the plurality of virtual objects;

traverse an animation tree based on the position and pose indication data of each virtual object to obtain a traversing result of each virtual object, leaf nodes of the animation tree being associated with animation frames; and obtain the plurality of animation frames corresponding to each of the plurality of virtual objects and the weight of each animation frame according to a plurality of traversing results corresponding to the plurality of virtual objects.

In a possible implementation, the obtaining module 1301 is further configured to traverse the animation tree to obtain animation frames associated with all the leaf nodes of the animation tree.

The apparatus further includes:

a second storage module configured to store the animation frames associated with all the leaf nodes in a second map.

The obtaining module 1301 is configured to obtain the plurality of animation frames corresponding to the plurality of virtual objects and the weight of each animation frame from the second map according to the plurality of traversing results corresponding to the plurality of virtual objects.

In a possible implementation, the obtaining module 1301 is configured to perform, through a plurality of task threads in a central processing unit, the step of obtaining the plurality of animation frames corresponding to each of the plurality of virtual objects and the weight of each animation frame.

In a possible implementation, the apparatus further includes:

a writing module configured to write the plurality of animation frames corresponding to each of the plurality of virtual objects and the weight of each animation frame into a cache.

The blending module 1302 is configured to:

extract the plurality of animation frames corresponding to each of the plurality of virtual objects and the weight of each animation frame from the cache through the image processor; and perform the step of blending a plurality of animation frames corresponding to the plurality of virtual objects in parallel according to the weight of each animation frame, to obtain target position and pose data of each bone in the bone models of the plurality of virtual objects.

In a possible implementation, the display module 1303 is configured to:

skin each virtual object according to the target position and pose data of each bone in the bone model of each virtual object to obtain a display form of each virtual object; and display the display form of each virtual object in the graphical user interface.

According to the apparatus provided in the embodiments of the present disclosure, the plurality of animation frames and weights corresponding to the plurality of virtual objects are obtained, animation frame blending is performed on the plurality of virtual objects in parallel through the image processor to obtain the target position and pose data of each bone in the bone model of each virtual object, and the target position and pose data is used as a basis for displaying the plurality of virtual objects, so as to display the plurality of virtual objects. In this process, by performing animation frame blending on the plurality of virtual objects in parallel through the image processor, there is no need to obtain the animation frames and the weights one by one by the central processing unit and to blend and display the animation frames, thus the processing burden of the central processing unit can be effectively reduced to avoid the problem of overload of the central processing unit. Therefore, the processing efficiency can be greatly improved, thereby improving the display efficiency of the virtual object display process, and the display effect of the virtual object is also improved.

When the apparatuses for triggering an intelligent network service provided in the foregoing embodiments trigger an intelligent network service, the division of the foregoing functional modules is used as an example for illustration. In practical applications, different functional modules are allocated to implement the foregoing functions according to requirements, that is, the internal structure of the device is divided into different functional modules to implement all or some of the functions described above. In addition, the apparatuses for triggering an intelligent network service provided in the foregoing embodiments are based on the same concept as the methods for triggering an intelligent network service in the foregoing embodiments. For the specific implementation process, refer to the method embodiments, and the details are not described herein again.

Figure 14:
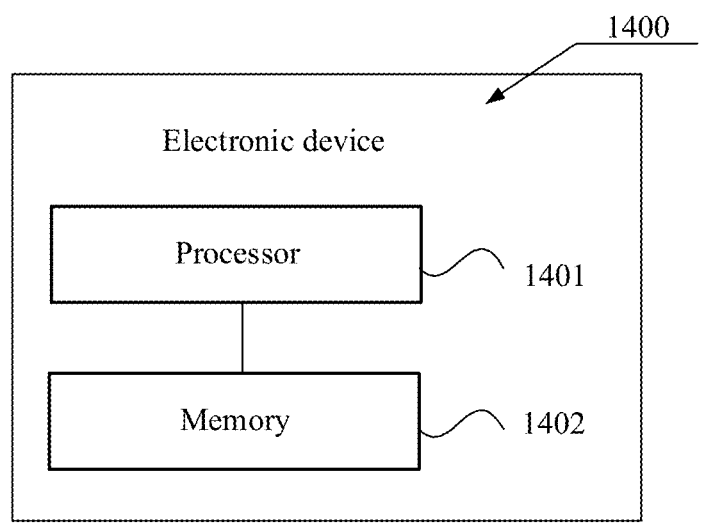
FIG. 14 is a schematic structural diagram of an electronic device according to an embodiment of the present disclosure.

FIG. 14 is a schematic structural diagram of an electronic device according to an embodiment of the present disclosure. The electronic device 1400 may vary a lot due to different configurations or performance, and may include one or more central processing units (CPUs) 1401 and one or more memories 1402. The one or more memories 1402 stores at least one instruction, the at least one instruction being loaded and executed by the one or more CPUs 1401 to implement the display method for a virtual object provided in the foregoing method embodiments. Certainly, the electronic device 1400 may further include components such as a wired or wireless network interface, a keyboard, and an input/output (I/O) interface, to facilitate input and output. The electronic device 1400 may further include another component configured to implement a function of a device. Details are not further described herein.

In an exemplary embodiment, a computer-readable storage medium, such as a memory including an instruction, is further provided, and the instruction may be executed by a processor to complete the display method for a virtual object in the foregoing embodiments. For example, the computer-readable storage medium may be a read-only memory (ROM), a RAM, a compact disc ROM (CD-ROM), a magnetic tape, a floppy disk, an optical data storage device, or the like.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in this application may all include a non-volatile and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists. The foregoing embodiments only describe several implementations of this application specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. A display method for a virtual object, executed by an electronic device, comprising:
   obtaining a plurality of animation frames corresponding to each of a plurality of virtual objects and each animation frame's weight, each animation frame comprising position and pose data of each bone in bone models of the virtual objects;
   blending the plurality of animation frames corresponding to the plurality of virtual objects in parallel through an image processor according to each animation frame's weight to obtain target position and pose data of each bone in the bone models of the plurality of virtual objects by:
      obtaining a plurality of parallel channels of the image processor according to a number of the plurality of virtual objects, a number of the parallel channels being determined according to the number of the virtual objects; and
      blending the plurality of animation frames corresponding to the plurality of virtual objects in parallel through the plurality of parallel channels of the image processor according to each animation frame's weight to obtain the target position and pose data of each bone in the bone models of the plurality of virtual objects; and
   displaying the plurality of virtual objects in a graphical user interface according to the target position and pose data of each bone in the bone models of the plurality of virtual objects.

2. The method according to claim 1, wherein each of the parallel channel is configured for one virtual object.

3. The method according to claim 1, wherein blending the plurality of animation frames corresponding to the plurality of virtual objects in parallel comprises:
   for each of the plurality of virtual objects, weighting the position and pose data of each bone in the bone models in the plurality of animation frames corresponding to the each virtual object according to the plurality of animation frames' weights corresponding to the each virtual object to obtain the target position and pose data of each bone in the bone model of the each virtual object.

4. The method according to claim 1, wherein blending the plurality of animation frames corresponding to the plurality of virtual objects in parallel comprises:
   for each of the plurality of virtual objects, selecting a preset number of animation frames having maximum weights among the corresponding plurality of animation frames; and
   blending the selected animation frames according to the corresponding weights to obtain the target position and pose data of each bone in the bone model of each virtual object.

5. The method according to claim 1, wherein, after blending the plurality of animation frames corresponding to the plurality of virtual objects in parallel, the method further comprises:
- storing the target position and pose data of each bone in the bone models of the plurality of virtual objects in a first map,
- wherein displaying the plurality of virtual objects in the graphical user interface according to the target position and pose data of each bone in the bone models of the plurality of virtual objects comprises:
  - sampling the first map to display the plurality of virtual objects in the graphical user interface according to a sampling result.

6. The method according to claim 5, wherein storing the target position and pose data of each bone in the bone models of the plurality of virtual objects in the first map comprises:
- storing the target position and pose data of each bone in the bone models of the plurality of virtual objects and corresponding identification information of the plurality of virtual objects in the first map,
- wherein sampling the first map to display the plurality of virtual objects in the graphical user interface according to the sampling result comprises:
  - sampling the first map according to the identification information of the plurality of virtual objects to display the plurality of virtual objects in the graphical user interface according to the sampling result.

7. The method according to claim 6, wherein sampling the first map according to the identification information of the plurality of virtual objects to display the plurality of virtual objects in the graphical user interface according to the sampling result comprises:
- instancing a draw call to obtain an object, the draw call comprising the identification information of the plurality of virtual objects; and
- sampling the first map according to the identification information of the plurality of virtual objects by using the object to display the plurality of virtual objects in the graphical user interface according to the sampling result.

8. The method according to claim 1, wherein obtaining the plurality of animation frames corresponding to each of a plurality of virtual objects and each animation frame's weight comprises:
- obtaining position and pose indication data of the plurality of virtual objects;
- traversing an animation tree based on the position and pose indication data of each virtual object to obtain a traversing result of each virtual object, leaf nodes of the animation tree being associated with animation frames; and
- obtaining the plurality of animation frames corresponding to each of the plurality of virtual objects and each animation frame's weight according to a plurality of traversing results corresponding to the plurality of virtual objects.

9. The method according to claim 8, wherein before obtaining the plurality of animation frames corresponding to each of the plurality of virtual objects and each animation frame's weight, the method further comprises:
- traversing the animation tree to obtain animation frames associated with the leaf nodes of the animation tree; and
- storing the animation frames associated with the leaf nodes in a second map; and
- wherein obtaining the plurality of animation frames corresponding to each of the plurality of virtual objects and each animation frame's weight according to a plurality of traversing results corresponding to the plurality of virtual objects comprises:
  - obtaining the plurality of animation frames corresponding to the plurality of virtual objects and the each animation frame's weight from the second map according to the plurality of traversing results corresponding to the plurality of virtual objects.

10. The method according to claim 1, wherein obtaining the plurality of animation frames corresponding to each of a plurality of virtual objects and each animation frame's weight comprises:
- obtaining the plurality of animation frames corresponding to each of the plurality of virtual objects and each animation frame's weight through a plurality of task threads in a central processing unit.

11. The method according to claim 1, wherein after obtaining the plurality of animation frames corresponding to each of the plurality of virtual objects and each animation frame's weight, the method further comprises:
- writing the plurality of animation frames corresponding to each of the plurality of virtual objects and the each animation frame's weight into a cache; and
- wherein blending the plurality of animation frames corresponding to the plurality of virtual objects in parallel through the image processor according to each animation frame's weight to obtain the target position and pose data of each bone in the bone models of the plurality of virtual objects comprises:
  - extracting the plurality of animation frames corresponding to each of the plurality of virtual objects and each animation frame's weight from the cache through the image processor; and
  - blending the plurality of animation frames corresponding to the plurality of virtual objects in parallel according to each animation frame's weight to obtain the target position and pose data of each bone in the bone models of the plurality of virtual objects.

12. The method according to claim 1, wherein displaying the plurality of virtual objects in the graphical user interface according to the target position and pose data of each bone in the bone models of the plurality of virtual objects comprises:
- skinning each virtual object according to the target position and pose data of each bone in the bone model of each virtual object to obtain a display form of each virtual object; and
- displaying the display form of each virtual object in the graphical user interface.

13. An electronic device, comprising one or more processors and one or more memories, the one or more memories storing at least one computer-readable instruction, the one or more processors being configured to load the at least one computer-readable instruction to perform the method of claim 1.

14. A display apparatus for a virtual object, comprising:
- at least one processor, configured to:
  - obtain a plurality of animation frames corresponding to each of a plurality of virtual objects and each animation frame's weight, each animation frame comprising position and pose data of each bone in bone models of the virtual objects; and
  - blend a plurality of animation frames corresponding to the plurality of virtual objects in parallel according to each animation frame's weight to obtain target position and pose data of each bone in the bone models of the plurality of virtual objects by:
  obtaining a plurality of parallel channels of the processor according to a number of the plurality of virtual objects, a number of the parallel channels being determined according to the number of the virtual objects; and
  blending the plurality of animation frames corresponding to the plurality of virtual objects in parallel through the plurality of parallel channels of the processor according to each animation frame's weight to obtain the target position and pose data of each bone in the bone models of the plurality of virtual objects; and
a display in communication with the at least one processor and configured to display the plurality of virtual objects in a graphical user interface according to the target position and pose data of each bone in the bone models of the plurality of virtual objects.

15. The display apparatus of claim 14, wherein the number of the virtual objects is equal to the number of the parallel channels.

16. The display apparatus of claim 14, wherein, to blend the plurality of animation frames corresponding to the plurality of virtual objects in parallel, the at least one processor is further configured to:
  for each of the plurality of virtual objects, weight the position and pose data of each bone in the bone models in the plurality of animation frames corresponding to each virtual object according to the plurality of animation frames' weights corresponding to each virtual object to obtain the target position and pose data of each bone in the bone model of each virtual object.

17. The display apparatus of claim 14, wherein, to blend the plurality of animation frames corresponding to the plurality of virtual objects in parallel, the at least one processor is further configured to:
  for each of the plurality of virtual objects, select a preset number of animation frames having maximum weights among the corresponding plurality of animation frames; and
  blend the selected animation frames according to the selected animation frames' weights to obtain the target position and pose data of each bone in the bone model of each virtual object.

18. A non-transitory computer-readable storage medium, storing at least one instruction, the instruction being loaded and executed by at least one processor to cause the at least one processor to perform the steps, comprising:
  obtaining a plurality of animation frames corresponding to each of a plurality of virtual objects and each animation frame's weight, each animation frame comprising position and pose data of each bone in bone models of the virtual objects;
  blending the plurality of animation frames corresponding to the plurality of virtual objects in parallel through an image processor according to each animation frame's weight to obtain target position and pose data of each bone in the bone models of the plurality of virtual objects by:
    obtaining a plurality of parallel channels of the image processor according to a number of the plurality of virtual objects, a number of the parallel channels being determined according to the number of the virtual objects; and
    blending the plurality of animation frames corresponding to the plurality of virtual objects in parallel through the plurality of parallel channels of the image processor according to each animation frame's weight to obtain the target position and pose data of each bone in the bone models of the plurality of virtual objects; and
  displaying the plurality of virtual objects in a graphical user interface according to the target position and pose data of each bone in the bone models of the plurality of virtual objects.

19. The storage medium according to claim 18, wherein the number of the virtual objects is equal to the number of the parallel channels.

20. The storage medium according to claim 18, wherein to blend the plurality of animation frames corresponding to the plurality of virtual objects in parallel, the at least one processor is further caused to perform the steps comprising:
  for each of the plurality of virtual objects, selecting a preset number of animation frames having maximum weights among the corresponding plurality of animation frames; and
  blending the selected animation frames according to the selected animation frames' weights to obtain the target position and pose data of each bone in the bone model of each virtual object.

* * * * *